(12) United States Patent
Kowaguchi

(10) Patent No.: US 6,334,143 B2
(45) Date of Patent: Dec. 25, 2001

(54) ELECTRONIC MAIL SYSTEM, ELECTRONIC MAIL SERVER, AND COMMUNICATION TERMINAL

(75) Inventor: Satoshi Kowaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/733,678

(22) Filed: Dec. 8, 2000

Related U.S. Application Data

(62) Division of application No. 09/182,040, filed on Oct. 29, 1998, now Pat. No. 6,185,605.

(30) Foreign Application Priority Data

Nov. 11, 1997 (JP) .................................................... 9-327093

(51) Int. Cl.⁷ ............................................ G06F 15/16
(52) U.S. Cl. ........................................ 709/206; 709/202
(58) Field of Search .................................... 709/206, 202, 709/203, 218, 235

(56) References Cited

U.S. PATENT DOCUMENTS

| 5,944,786 | 8/1999 | Quinn . |
| 6,035,104 | 3/2000 | Zahariev . |
| 6,052,709 | 4/2000 | Paul . |
| 6,052,734 | 4/2000 | Ito et al. . |
| 6,065,044 | 5/2000 | Ogasawara . |
| 6,065,048 | 5/2000 | Higley . |

FOREIGN PATENT DOCUMENTS

| 0 375-456-A2 | 6/1990 | (EP) . |
| 0 506-592 A1 | 9/1992 | (EP) . |
| 2-58451 | 2/1990 | (JP) . |
| 4-138741 | 5/1992 | (JP) . |
| 4-236541 | 8/1992 | (JP) . |
| 5-14406 | 1/1993 | (JP) . |
| 5-110596 | 8/1993 | (JP) . |
| 5-241992 | 9/1993 | (JP) . |
| 6-21969 | 1/1994 | (JP) . |
| 9-172462 | 6/1997 | (JP) . |
| 10-173702 | 6/1998 | (JP) . |
| 10-240648 | 9/1998 | (JP) . |
| 97/28518 | 8/1997 | (WO) . |

*Primary Examiner*—David Wiley
(74) *Attorney, Agent, or Firm*—Scully, Scott, Murphy & Presser

(57) ABSTRACT

Disclosed is an electronic mail system, which comprises: a transmitting communication terminal for transmitting an electronic mail to which an address is added; an electronic mail server for storing an electronic mail transmitted from the transmitting communication terminal; and a receiving communication terminal for receiving an electronic mail having an address thereof from the electronic mail server, wherein the electronic mail server comprises: managing means for managing an address and call number of the receiving communication terminal; receiving means for receiving an electronic mail from the transmitting communication terminal; storing means for storing the electronic mail received by the receiving means; retrieving means for retrieving a call number of the receiving communication terminal managed by the managing means corresponding to an address added to the electronic mail received by the receiving means; and distributing means for transmitting the electronic mail received by the receiving means to the receiving communication terminal having the call number retrieved by the retrieving means, and wherein the receiving means comprises: receiving means for receiving the electronic mail distributed by the distributing means.

4 Claims, 6 Drawing Sheets

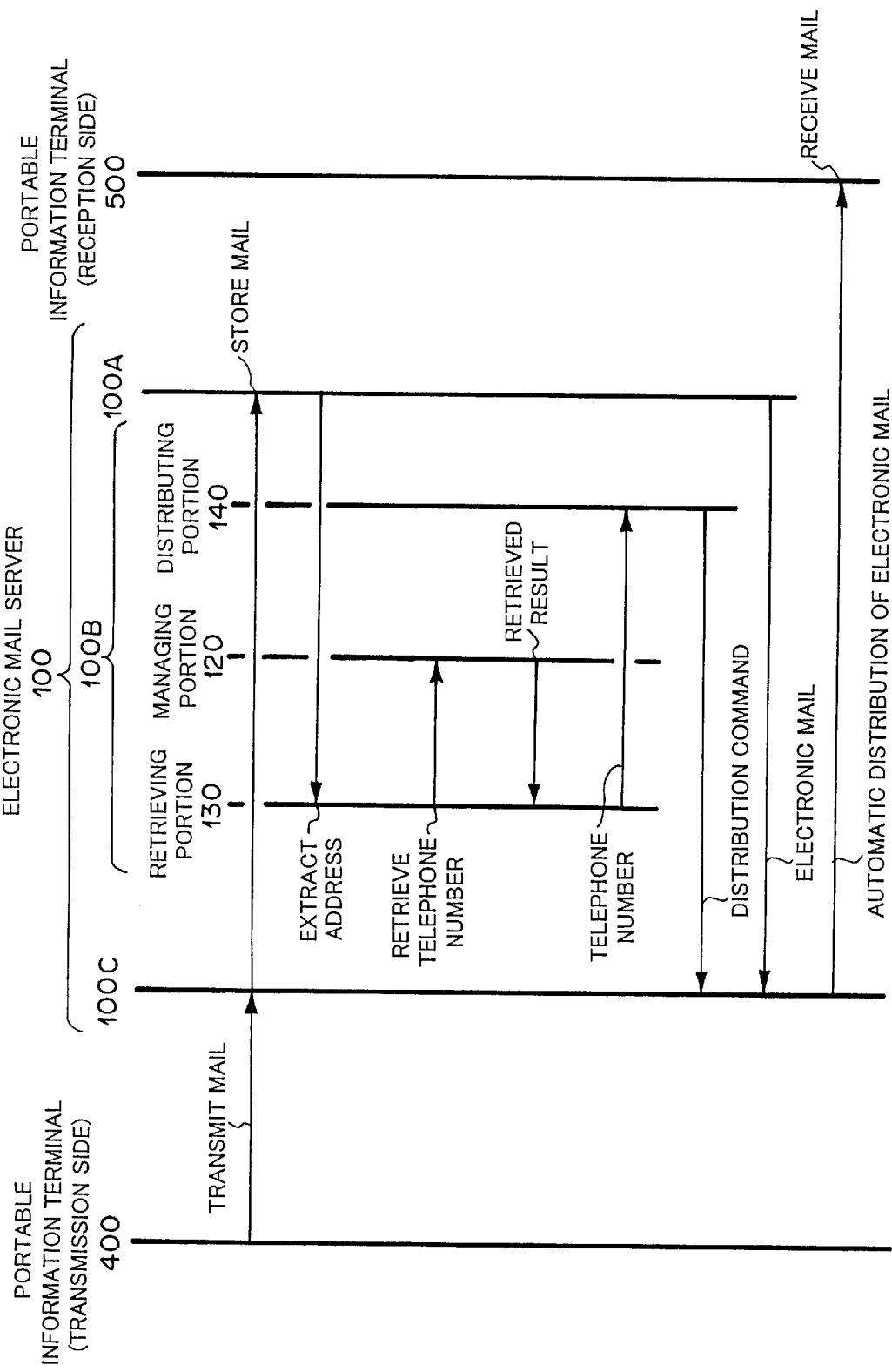

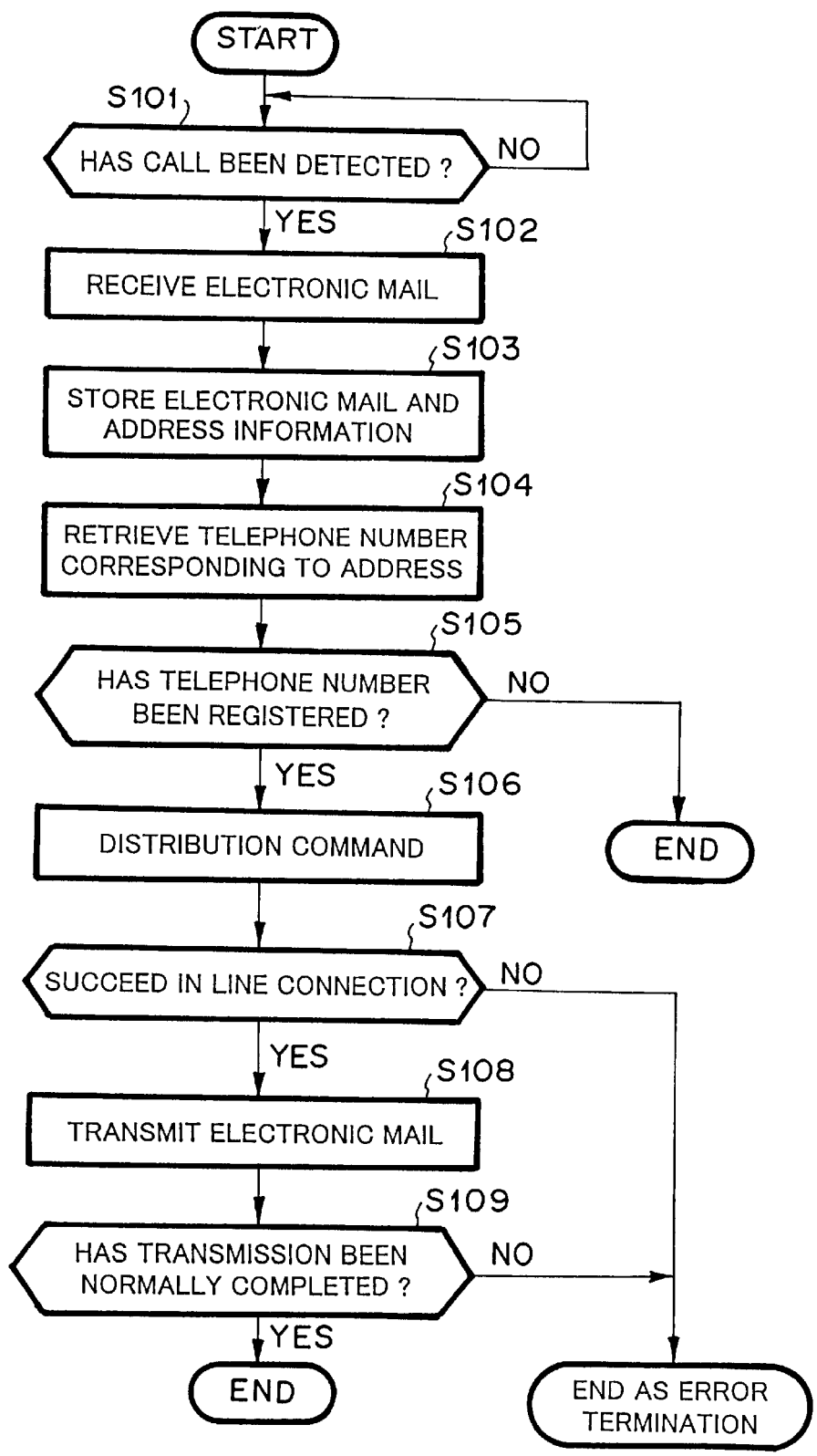

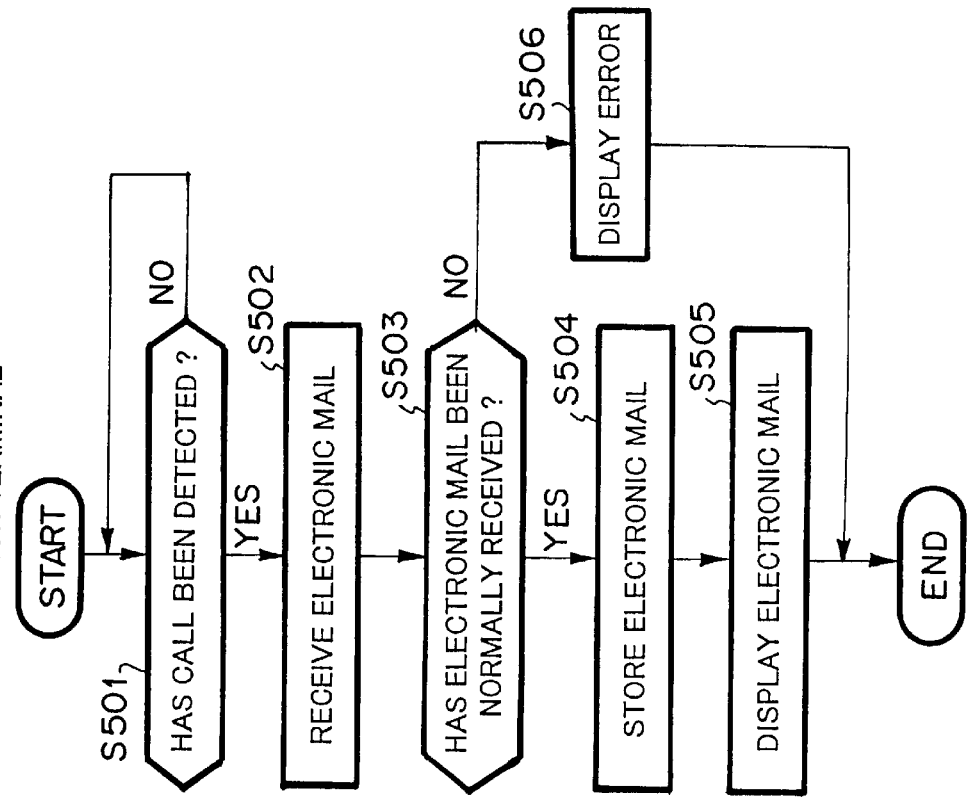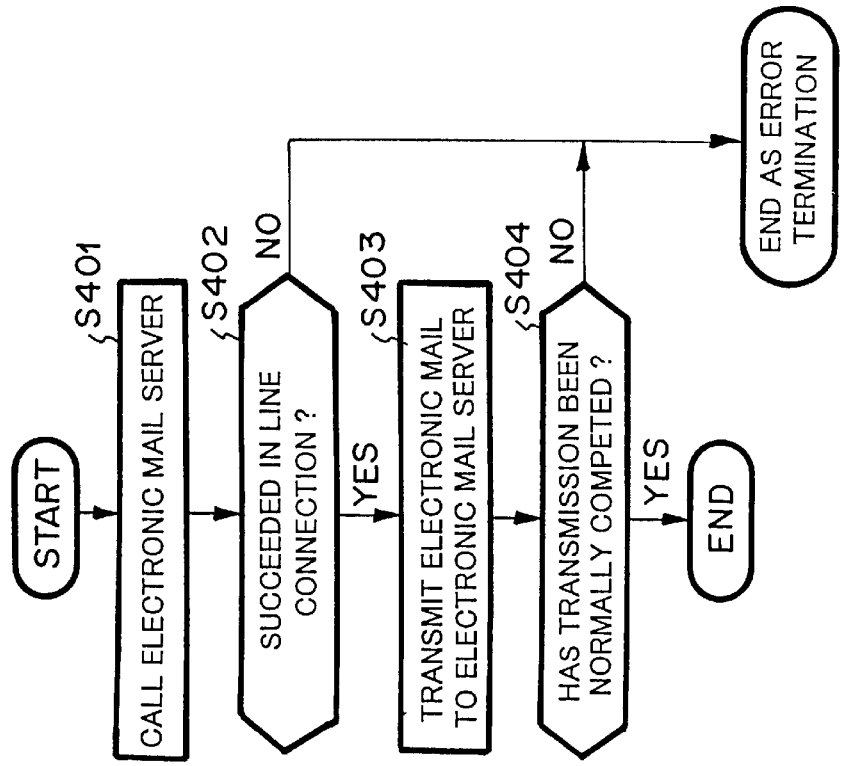

ELECTRONIC MAIL SYSTEM,
ELECTRONIC MAIL SERVER, AND
COMMUNICATION TERMINAL

CROSS REFERENCE TO RELATED APPLICATION

The present application is a divisional of application Ser. No. 09/182,040 filed on Oct. 29, 1998 U.S. Pat. No. 6,185,605.

BACKGROUND OF THE INVENTION

1. Field of the Invention

The present invention relates to an electronic mail system, an electronic mall server, and a communication terminal.

2. Description of the Prior Art

In a conventional electronic mail system, an electronic mail is transmitted from a transmitting communication terminal and the transmitted electronic mail is stored in an electronic mail server. A receiving communication terminal accesses the electronic mail server so as to retrieve the electronic mail addressed to the receiving communication terminal from the electronic mail server.

The electronic mail server registers and manages address information of the receiving communication terminals. The transmitting communication terminal adds the address information to an electronic mail and transmits the addressed electronic mail to the electronic mail server. The electronic mail server stores the received electronic mail in a mail box corresponding to the address information added to the electronic mail.

The receiving communication terminal asks the electronic main server for an electronic mail addressed to the receiving communication terminal. When the electronic mail server has stored an electronic mail addressed to the receiving communication terminal, the receiving communication terminal sends an electronic mail retrieval request to the electronic mail server and receives the electronic main therefrom.

In such an electronic mail system, when the electronic mail server has received an electronic mail addressed to a receiving communication terminal, the receiving communication terminal cannot be informed of the electronic mail stored in the mail box of the electronic mail server. Thus, the receiving communication terminal cannot receive an urgent electronic mail.

In order to solve such a problem, when the electronic mail server has received an electronic mail addressed to a receiving communication terminal or pager registered in the electronic mail server, it informs the registered receiving communication terminal or pager of the reception of the electronic mail. Thus, the user of the registered receiving communication terminal or pager can know that the electronic mail server has received the electronic mail addressed to the user. This electronic mail system has been proposed in, for example, JPA-5-110596 and JPA-2-21969.

However, the conventional electronic mail system having such a reception informing function only informs the reception-side-user of the fact that the electronic mail server has received an electronic mail addressed to the user. Thus, the reception-side-user needs to transmit an electronic mail retrieval request to the electronic mail server and receive the electronic mail therefrom. Consequently, in the conventional electronic mail system, the reception-side-user needs to perform complicated operations.

SUMMARY OF THE INVENTION

Therefore, an object of the present invention is to provide an electronic mail system, an electronic mail server, and a communication terminal that enables a receiving communication terminal to automatically receive an electronic mail addressed thereto in real time.

According to a first aspect of the present invention, there is provided an electronic mail system, which comprises: a transmitting communication terminal for transmitting an electronic mail to which an address is added; an electronic mail server for storing a electronic mail transmitted from the transmitting communication terminal; and a receiving communication terminal for receiving a electronic mail having an address thereof from the electronic mail server, wherein the electronic mail server comprises: managing means for managing an address and call number of the receiving communication terminal; receiving means for receiving an electronic mail from the transmitting communication terminal; storing means for storing the electronic mail received by the receiving means; retrieving means for retrieving a call number of the receiving communication terminal managed by the managing means corresponding to an address added to the electronic mail received by the receiving means; and distributing means for transmitting the electronic mail received by the receiving means to the receiving communication terminal having the call number retrieved by the retrieving means, and wherein the receiving means comprises: receiving means for receiving the electronic mail distributed by the distributing means.

In such an electronic mail system, when the electronic mail server has received an electronic mail from a transmitting communication terminal, the electronic mail server retrieves a call number such as a telephone number registered corresponding to address added to the electronic mail and automatically distributes the received electronic mail to the receiving communication terminal having the call number. The receiving communication terminal receives the electronic mail from the electronic mail server. Thus, the receiving communication terminal can automatically receive the electronic mail from the transmitting communication terminal.

According to a second aspect of the present invention, there is provided an electronic mail server, which comprises: managing means for managing an address and call number of a receiving communication terminal; receiving means for receiving an electronic mail from a transmitting communication terminal; storing means for storing the electronic mail received by the receiving means; retrieving means for retrieving a call number of the receiving communication terminal managed by the managing means corresponding to an address added to the electronic mail received by the receiving means; and distributing means for transmitting the electronic mail received by the receiving means to the receiving communication terminal having the call number retrieved by the retrieving means.

When such an electronic mail server has received an electronic mail from a transmitting communication terminal, the electronic mail server retrieves a call number registered corresponding to address added to the electronic mail and automatically distributes the received electronic mail to a receiving communication terminal having the call number. Thus, the receiving communication terminal can automatically receive the electronic mail from the transmitting communication terminal.

According to a third aspect of the present invention, there is provided a communication terminal whose address and call number are managed by an electronic mail server having distributing means, which terminal comprises: electronic mail creating means for creating an electronic mail; electronic mail storing means for storing the electronic mail; electronic mail transmitting means for transmitting the electronic mail to the electronic mail server; receiving means for receiving an electronic mail from the electronic mail server and storing the electronic mail to the electronic mail storing means; and electronic mail displaying means for displaying the electronic mail.

In case that such a communication terminal transmits an electronic mail, an electronic mail creating means creates the electronic mail, adds address information to the created electronic mail, and transmits the resultant electronic mail to an electronic mail server having an automatic distributing means. When the communication terminal receives an electronic mail from the electronic mail server having the automatic distributing function, the communication terminal automatically receives the electronic mail, stores the electronic mail in an electronic mail storing means, displays the electronic mail on an electronic mail displaying means, and informs the user of the reception of the electronic mail. Thus, the receiving communication terminal can automatically receive an electronic mail from the transmitting communication terminal and inform the reception-side-user of the reception of the electronic mail.

These and other objects, features and advantages of the present invention will become more apparent in light of the following detailed description of the best mode of embodiments thereof, as illustrated in the accompanying drawings.

BRIEF DESCRIPTION OF THE DRAWINGS

FIG. 4 is a schematic diagram for explaining a transmission/reception sequence of an electronic mail transmitted/received between each communication terminal and the electronic mail server in the electronic mail system shown in FIG. 1;

FIG. 5 is a flow chart showing the operation of the electronic mail server in the electronic mail system shown in FIG. 1;

FIG. 6A is a flow chart showing the operation of a transmitting communication terminal in the electronic mail system shown in FIG. 1; and FIG. 6B is a flow chart showing the operation of a receiving communication terminal in the electronic mail system shown in FIG. 1.

DESCRIPTION OF PREFERRED EMBODIMENTS

Next, an electronic mail system, an electronic mail server, and a communication terminal according to embodiments of the; present invention will be explained.

Figure 1:
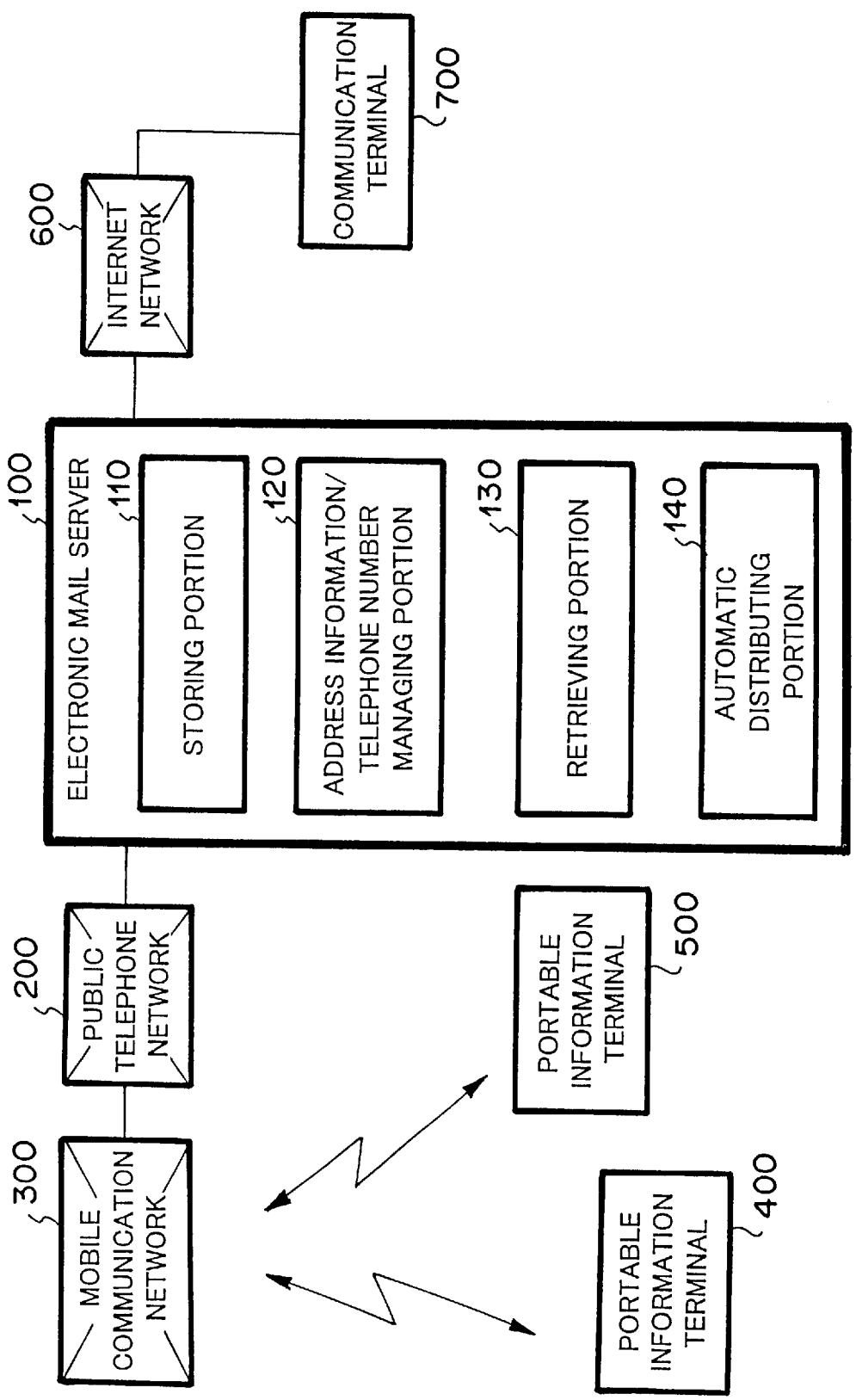
FIG. 1 is a block diagram showing an example of the structure of an electronic mail system according to the present invention.

In FIG. 1, the electronic mail system comprises electronic mail server 100, portable information terminals (mobile communication terminals) 400 and 500, and communication terminal 700. Electronic mail server 100 has an automatic distributing function. Portable in formation terminals 400 and 500 are connected to electronic mail server 100 through public telephone network 200 and mobile communication network 300. Communication terminal 700 is connected to electronic mail server 100 through Internet network 600.

FIG. 1 also shows major functions of electronic mail server 100. As shown in FIG. 1, the electronic mail server 100 comprises storing portion 110, address information/telephone number: managing portion 120, retrieving portion 130, and automatic distributing portion 140.

Storing portion 110 stores an electronic mail received from a transmitting communication terminal. Storing portion 110 has mail boxes corresponding to addresses (address information) of electronic mails.

Address information/telephone number managing portion 120 stores address information of destinations of electronic mails and telephone numbers of receiving communication terminals registered corresponding to the destinations, connectedly.

Retrieving portion 130 retrieves the telephone number corresponding to address information of an electronic mail received from a transmitting communication terminal from management information of address information/telephone number managing portion 120.

Automatic distributing portion 140 calls a receiving communication terminal with a telephone number retrieved by retrieving portion 130 so as to transmit the received electronic mail to the receiving communication terminal.

In such a structure, electronic mail server 100 retrieves a telephone number of a registered receiving communication terminal corresponding to address information added to an electronic mail received from transmitting communication terminal 700 and automatically distributes the electronic mail to receiving communication terminal 400 or 500 with the telephone number.

Such a service that electronic mail server 100 provides can be used by terminals such as a conventional wired communication terminal (not shown) connected to public telephone network 200, portable information terminals 400 and 500 connected to mobile communication network 300, communication terminal 700 connected to Internet network 600, and so forth.

When electronic mail server 100 receives an electronic mail addressed to a receiving communication terminal whose telephone number has not been registered, electronic mail server 100 does not automatically distribute the received electronic mail to the receiving communication terminal. In this case, electronic mail server 100 stores the received electronic mail in the mail box in storing portion 110. When electronic mail server 100 receives an electronic mail retrieval request from the receiving communication terminal, electronic mail server 100 transmits the electronic mail stored in the main box to the receiving communication terminal.

Thus, when a receiving-side-user of an electronic mail does not want to use the automatic distribution service of electronic mail server 100, the user does not register his or her telephone number with address information/telephone number managing portion 120. In this case, the user can use electronic mail server 100 as a conventional electronic mail server.

Although an telephone number is used as a call number for transmitting an electronic mail to a communication terminal in this example, any of other various access numbers may be used as a call number.

Figure 2:
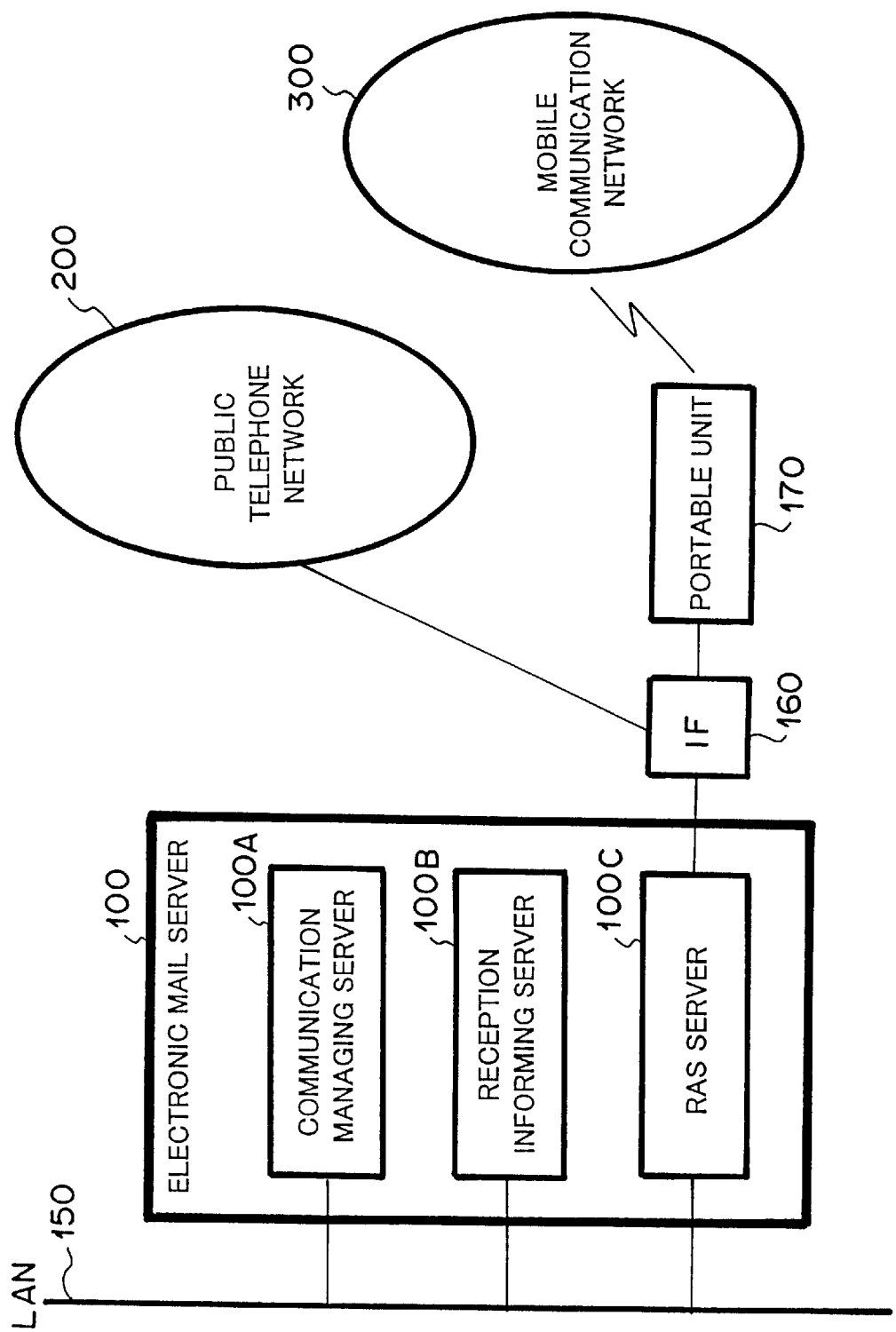
FIG. 2 is a block diagram showing an example of the structure of an electronic mail server in the electronic mail system shown in FIG. 1.

Referring to FIG. 2, electronic mail server 100 has communication managing server 100A, reception informing server 100B, and an RAS (Remote Access Service) Server 100C.

Communication managing server 100A includes storing portion 110 explained above. When electronic mail server 100 receives an electronic mail from a transmitting communication terminal, communication managing server 100A performs a receiving process for the electronic mail and stores the received electronic mail in storing portion 110.

Reception informing server 100B includes address information/telephone number managing portion 120, the retrieving portion 130, and automatic distributing portion 140, which were explained above. Reception informing server 100B extracts address information from the received electronic mail, retrieves a telephone number from address information/telephone number managing portion 120, and automatically distributes the electronic mail to a receiving communication terminal having the retrieved telephone number.

RAS server 100C controls a network function such as dial-up connection.

Communication managing server 109A, reception informing server 100B, and RAS server 100C are mutually connected by a LAN (Local Area Network) so as to communicate with one another.

RAS server 100C is connected to external interface 160. RAS server 100C is connected to public telephone network 200 through external interface 160. External interface 160 is also connected to portable unit 170 such as a radio adaptor or a radio communication unit. RAS server 100C is connected to mobile communication network 300 through portable unit 170.

In such a structure, RAS server 100C is connected to various communication terminals through communication networks 200, 300, and 600 so as to transmit/receive electronic mails to/from various communication terminals.

Figure 3:
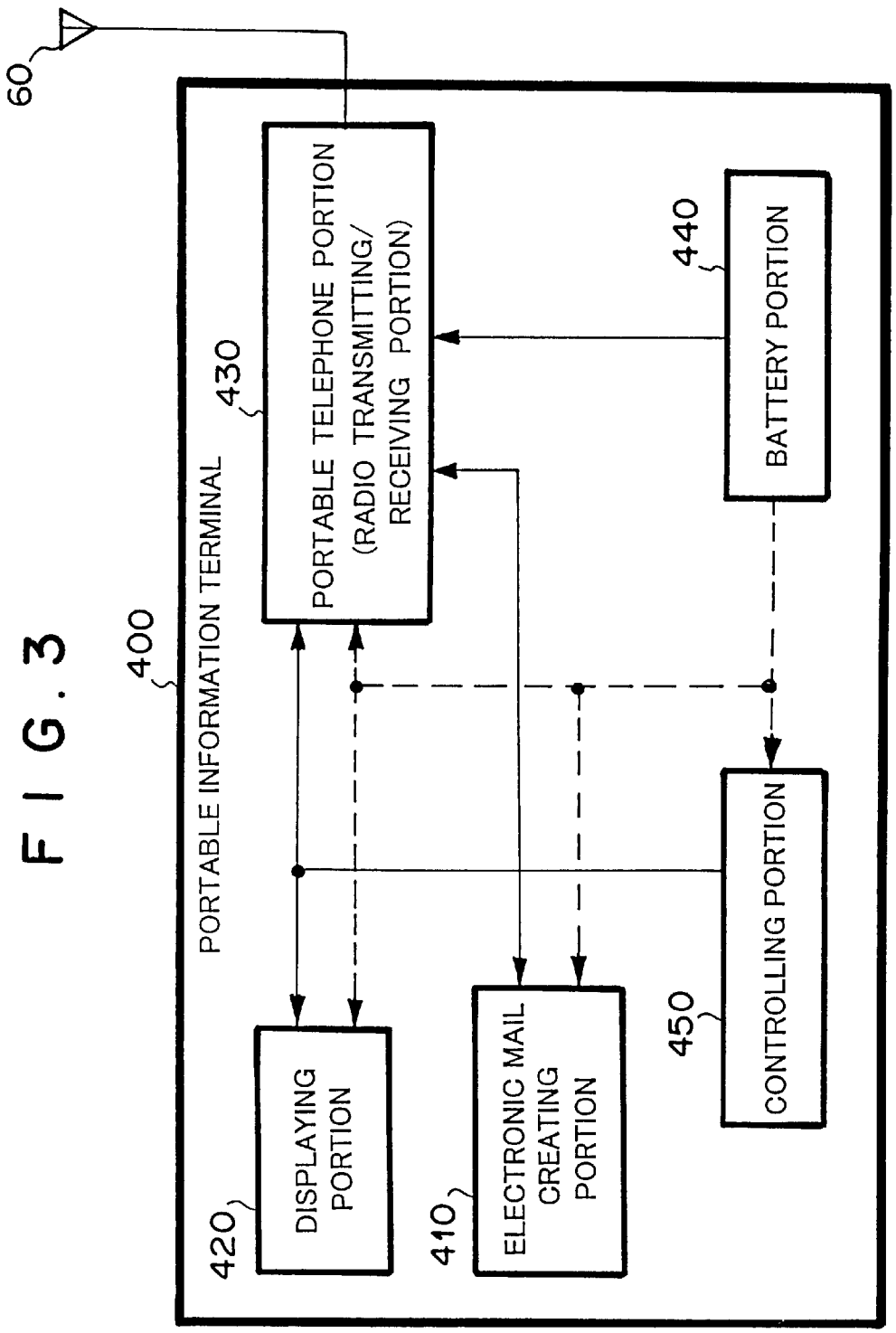
FIG. 3 is a block diagram showing an example of the structure of a portable information terminal in the electronic mail system shown in FIG. 1.

Referring to FIG. 3, portable information terminal 400 comprises electronic mail creating portion 410, displaying portion 420, portable telephone portion or radio transmitting/receiving portion 430, battery portion 440, controlling portion 450, and transmitting/receiving antenna 460.

Electronic mail creating portion 410 includes a data input operating portion and a data storing portion. The user creates an electronic mail by using the data input operating portion. The data storing portion stores the created electronic mail.

Displaying portion 420 includes a displaying panel such as an LCD (Liquid Crystal Display). The displaying panel displays an electronic mail that is being or has been created by using the electronic mail creating portion and an electronic mail that has been received. In addition, displaying portion 420 displays various data other than electronic mails.

Portable telephone portion 430 transmits/receives radio data through transmitting/receiving antenna 460. Battery portion 440 supplies power to each portion of portable communication terminal 400. Controlling portion 450 controls each portion of portable communication terminal 400.

The wired communication terminal used in the present, invention has the above-explained electronic mail creating portion and electronic mail displaying portion.

Next, the controlling operation of the electronic mail system will be explained along with the automatic distributing function of the electronic mail server.

FIG. 4 is a schematic diagram for explaining a transmission/reception sequence of an electronic mail transmitted/received between each communication terminal and electronic mail server 100 in the system.

In FIG. 4, portable information terminal 400 shown in FIG. 1 is a transmitting communication terminal and that portable information terminal 500 is a receiving communication terminal. FIG. 4 shows the operations of servers 100A, 100B, and 100C of electronic server 100 for an electronic mail transmitted from portable information terminal 400.

FIG. 5 is a flow chart showing the operation of electronic mail server 100. FIG. 6A is a flow chart showing the operation of transmitting communication terminal 400. FIG. 6B is a flow chart showing the operation of receiving communication terminal 500.

The transmitting communication terminal i.e. portable information terminal 400 calls electronic mail server 100 at step S401, confirms whether the line is connected at step S402, and transmits an electronic mail created by using electronic mail creating portion 410 to electronic mail server 100 at step S403.

When the electronic mail is transmitted, transmitting communication terminal 400 adds a destination address to the electronic mail. For example, transmitting communication terminal 400 adds address information "aaa@bbb.or.jp" to the electronic mail. Electronic mail server 100 uses account "aaa" for retrieving a telephone number corresponding to the address information.

Thereafter, transmitting communication terminal 400 confirms whether the electronic mail has been normally transmitted to electronic mail server 100 and completes the process at step S404. When the line can not be connected at step S402 or when a transmission error has taken place at step S404, the transmitting communication terminal completes the process as an error termination. Then, transmitting communication terminal 400 performs, for example, a re-transmitting process.

When electronic mail server 100 has received the electronic mail at step S101, electronic mail server 100 transfers the electronic mail to communication managing server 100A through the external interface 160 and the RAS server 100C. The communication managing server 100A performs a predetermined receiving process at step S102 and stores the electronic mail and the address thereof in storing portion 110 at step S103.

Next, retrieving portion 130 extracts the account "aaa" from the address information of the electronic mail, and confirms whether or not account "aaa" has been registered in address information/telephone number managing portion 120 at step S104.

Address information/telephone number managing portion 120 has registered a telephone number of a receiving communication terminal corresponding to the address information. For example, if address information/telephone number managing portion 120 has registered telephone number "010-12-34567" corresponding to account "aaa", then the data kilo registration format becomes "aaa 010-12-34567".

Retrieving portion 130 retrieves the telephone number "010-12-34567" corresponding to account "aaa" from address information/telephone number managing portion 120 at step S105.

Retrieving portion 130 transfers retrieved telephone number "010-12-34567" to automatic distributing portion 140. Automatic distributing portion 140 causes RAS server 100C to call portable information terminal 500 having telephone number "010-12-34567" at step S106. After the line has been connected at step S107, automatic distributing portion 140 transmits the electronic mail stored in storing portion 110 to portable information terminal 500 at step S108.

Thereafter, electronic mail server 100 confirms whether the electronic mail has been normally transmitted to portable information terminal 500 to complete the process at step S109. When the line can not be connected at step S107 or when a transmission error has taken place at step S109, electronic mail server 100 completes the process as an error termination and then performs, for example, a re-transmitting process.

At step S105, when retrieving portion 130 has not retrieved the telephone number, electronic mail server 100 completes the process. In this case, electronic mail server 100 transmits the electronic mail after receiving an electronic mail retrieval request from the receiving communication terminal.

When the electronic mail is transmitted from communication terminal 700 to portable information terminal 500 via Internet network 600 and LAN 150, the similar operation is performed. However, when an electronic mail is transmitted/received between PC (Personal Computer) clients in Internet network 600, unless address information/telephone number managing portion 120 has registered their telephone numbers, electronic mail server 100 does not perform the automatic distributing function.

When electronic mail server 100 starts to automatically distribute an electronic mail to portable information terminal 500, portable information terminal 500 detects a call received from a line at step S501, performs a predetermined receiving process, and receives the electronic mail at step S502.

When portable information terminal has normally received the electronic mail at step S503, the storing portion of electronic mail creating portion 410 stores the electronic mail at step S504. Then, displaying portion 420 displays the electronic mail at step S505 and completes the receiving process.

A message that represents the reception of an electronic mail may be displayed on displaying portion 420 instead of the electronic mail itself.

When portable information terminal 500 has not normally received an electronic mail at step S503, displaying portion 420 displays an error message at step S506 and completes the receiving process.

In the above-explained example, electronic mail server 100 determines whether or not to automatically distribute an electronic mail dependently on whether a telephone number corresponding to address information of the electronic mail has been registered. However, when the telephone number has been registered, the user can select an automatic distribution mode for causing an electronic mail to be automatically distributed, or a reception informing mode for informing the user of the reception of an electronic mail.

In this case, address information/telephone number managing portion 120 registers an identifier for identifying the automatic distribution mode or reception informing mode along with address information and telephone number. When the identifier represents the automatic distribution mode, the electronic mail server transmits a received electronic mail to a receiving communication terminal having a telephone number corresponding to address information added to the electronic mail. When the identifier represents the reception informing mode, the electronic mail server informs the user of the receiving communication terminal of the reception of the electronic mail.

As explained above, in the electronic mail system according to the present invention, when an electronic mail server has received an electronic mail from a transmitting communication terminal, the electronic mail server retrieves a call number such as a telephone number registered corresponding to address information added to the electronic mail and automatically distributes the received electronic mail to the receiving communication terminal having the call number, whereby the receiving communication terminal receives the electronic mail from the electronic mail server.

Thus, the receiving communication terminal can automatically receive the electronic mail from the transmitting communication terminal. The user of the receiving communication terminal need not to spontaneously retrieve an electronic mail from the electronic mail server. Consequently, a very convenient electronic mail system can be provided.

When the electronic mail server according to the present invention has received an electronic mail from a transmitting communication terminal, the electronic mail server retrieves a call number registered corresponding to address information added to the electronic mail and automatically distributes the received electronic mail to a receiving communication terminal having the call number.

Thus, the receiving communication terminal can automatically receive the electronic mail from the transmitting communication terminal. The user of the receiving communication terminal need not to spontaneously retrieve an electronic mail from the electronic mail server. Consequently, a very convenient electronic mail server can be provided.

In case that the communication terminal according to the present invention transmits an electronic mail, the communication terminal adds address information to an electronic mail created by using the electronic mail creating means, and then transmits the resultant electronic mail to an electronic mail server. When the communication terminal according to the present invention receives an electronic mail from the electronic mail server, the communication terminal automatically receives the electronic mail, stores the electronic mail in the electronic mail storing means, displays the electronic mall on the electronic mail displaying means, and informs the user of the reception of the electronic mail.

Thus, the communication terminal can automatically receive an electronic mail from the transmitting communication terminal and inform the user of the reception of the electronic mail. The user of the communication terminal need not to spontaneously retrieve an electronic mail from the electronic mail server. Consequently, a very convenient communication terminal can be provided.

Although the present invention has been shown and explained with respect to the best mode of embodiment thereof, it should be understood by those skilled in the art that the foregoing and various other changes, omissions, and additions in the form and detail thereof may be made therein without departing from the spirit and scope of the present invention.

What is claimed is:

1. A communication terminal whose address and call number are managed by an electronic mail server having distributing means, which terminal comprises:
   electronic mail creating means for creating an electronics mail;
   electronic mail storing means for storing said electronic mail;
   electronic mail transmitting means for transmitting the electronic mail to the electronic mail server;
   receiving means for receiving an electronic mail from said electronic mail server. and storing the electronic mail to said electronic mail storing means; and electronic mail displaying means for displaying the electronic mail.

2. The communication terminal as set forth in claim 1, which further comprises:

a radio controlling portion for transmitting and receiving data through a radio line; and a battery portion for supplying power to the communication terminal, thereby used as a portable communication terminal.

3. The communication terminal as set forth in claim 1, which further comprises means for adding an address corresponding to a receiving terminal to the electronic mail transmitted to said mail server.

4. The communication terminal as set forth in claim 3, which further comprises:

a radio controlling portion for transmitting and receiving data through a radio line; and a battery portion for supplying power to the communication terminal, thereby used as a portable communication terminal.

* * * * *